(12) United States Patent
Kataoka et al.

(10) Patent No.: US 7,705,505 B2
(45) Date of Patent: Apr. 27, 2010

(54) BRUSHLESS MOTOR

(75) Inventors: Nakaba Kataoka, Kyoto (JP); Keita Nakanishi, Kyoto (JP); Yoshiaki Yamashita, Kyoto (JP)

(73) Assignee: Nidec Corporation, Kyoto (JP)

( * ) Notice: Subject to any disclaimer, the term of this patent is extended or adjusted under 35 U.S.C. 154(b) by 302 days.

(21) Appl. No.: 11/859,950

(22) Filed: Sep. 24, 2007

(65) Prior Publication Data

US 2008/0073988 A1   Mar. 27, 2008

(30) Foreign Application Priority Data

Sep. 26, 2006 (JP) ............... 2006-259887

(51) Int. Cl.
*H02K 24/00* (2006.01)
(52) U.S. Cl. .............. 310/168; 310/68 B; 310/71; 180/443
(58) Field of Classification Search ........ 310/168, 310/68 B, 71; 324/207.25
See application file for complete search history.

(56) References Cited

U.S. PATENT DOCUMENTS

| | | | |
|---|---|---|---|
| 7,368,840 B2* | 5/2008 | Terauchi et al. ........... 310/68 D |
| 7,453,175 B2* | 11/2008 | Nakanishi et al. .......... 310/68 B |
| 7,595,572 B2* | 9/2009 | Haga et al. ............... 310/71 |
| 2003/0230945 A1* | 12/2003 | Okubo et al. ............. 310/112 |
| 2007/0069599 A1 | 3/2007 | Mimura |
| 2008/0079327 A1* | 4/2008 | Makino ................... 310/168 |
| 2008/0122304 A1* | 5/2008 | Makino et al. ............. 310/71 |

FOREIGN PATENT DOCUMENTS

| | | |
|---|---|---|
| JP | 2004-007903 | 1/2004 |
| WO | WO 2005/099068 | * 10/2005 |

OTHER PUBLICATIONS

Kataoka et al.; "Resolver and Brushless Motor"; U.S. Appl. No. 11/859,944, filed Sep. 24, 2007.

* cited by examiner

*Primary Examiner*—Burton Mullins
(74) *Attorney, Agent, or Firm*—Keating & Bennett, LLP

(57) ABSTRACT

A brushless motor includes at a substantially cylindrical portion of a bracket thereof a retaining mechanism which retains a resolver stator. The resolver stator whose axial movement and circumferential movement are minimized by the retaining mechanism will be affixed to the bracket.

6 Claims, 9 Drawing Sheets

BRUSHLESS MOTOR

BACKGROUND OF THE INVENTION

1. Field of the Invention

The present invention relates to a structure to secure a resolver to a brushless motor.

2. Description of the Related Art

A resolver is usually used in a brushless motor in order to detect a rotational position of a rotor magnet arranged in the brushless motor. The resolver includes a resolver stator having at an inner circumference thereof a plurality of teeth, and a resolver rotor arranged radially inwardly of the resolver stator. The resolver rotor arranged in a concentric manner with the rotor magnet rotates with the rotor magnet in a uniform manner.

An excitation winding or an output winding is wound around each tooth. When the resolver rotor rotates, its radial gap formed between the resolver stator will be modified causing a voltage generated by the output winding to be changed. The resolver detects the change in the voltage so as to detect the rotary portion of the rotor magnet within the brushless motor.

The excitation winding or the output winding wound around each tooth is connected to one end of a terminal member arranged at the resolver stator. The lead wire is connected to the other end of the terminal member. The lead wire connects an external control apparatus and the resolver.

As described above, the resolver detects, based on the modification of the gap between the resolver stator and the resolver rotor, the rotational position of the rotor magnet of the brushless motor. Therefore, precise alignment between the resolver stator and the resolver rotor has a significant effect on the accuracy of detection of the resolver, and thus, a reliable and secure connection between the resolver and the brushless motor becomes crucial. Also, when a brushless motor having therein such a resolver as described above is used in an automobile or the like, an area in which the brushless motor will be arranged has a limited space therefor, and therefore, it is preferable that the resolver is as small as possible.

A method of connecting the resolver to the brushless motor by using a screw via an attachment portion arranged at an outer circumferential side of the resolver stator has been available. Such method, however, requires a space for the screw increasing the size of the resolver stator in a radial direction. Also, using the screws increases the manufacturing cost of the resolver.

SUMMARY OF THE INVENTION

A brushless motor according to a preferred embodiment of the present invention includes a retaining structure retaining a resolver stator by a cylindrical or substantially cylindrical portion of a bracket. The resolver stator which is retained by the bracket and whose axial and circumferential positions are secured will be securely affixed to the brushless motor. By virtue of such configuration, the radial dimension of a resolver will be minimized while no extra component is required to minimize an axial and radial movement of the resolver stator, thereby securing the resolver stator to the bracket.

Other features, elements, steps, characteristics and advantages of the present invention will become apparent from the following detailed description of preferred embodiments thereof with reference to the attached drawings.

DETAILED DESCRIPTION OF THE PREFERRED EMBODIMENTS

Figure 1:
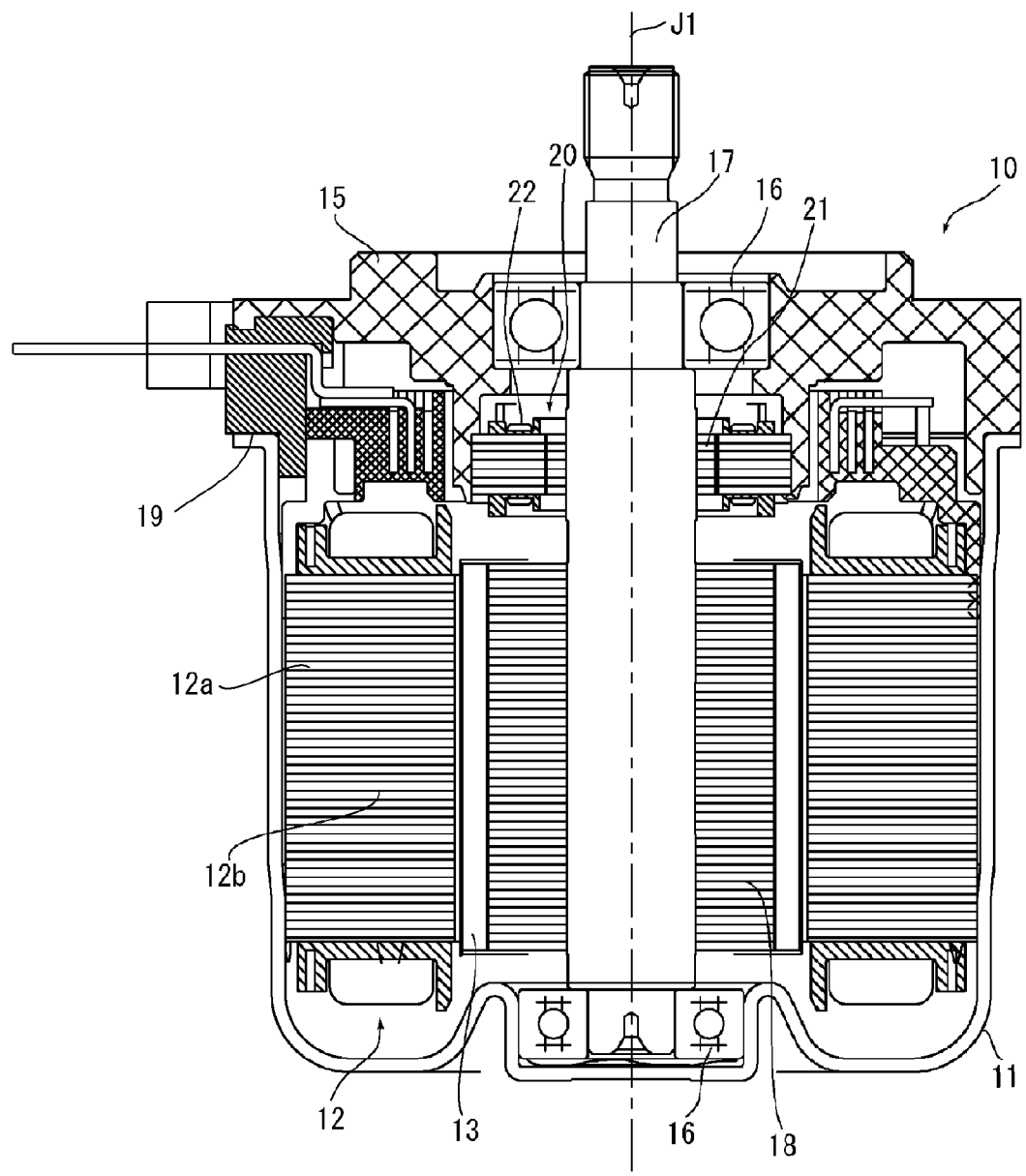
FIG. 1 is a cross sectional view of a brushless motor according to a preferred embodiment of the present invention.

Hereinafter, preferred embodiments of the present invention will be described with reference to FIG. 1 to FIG. 8. Note that in the description of the preferred embodiments of the present invention herein, words such as upper, lower, left, right, upward, downward, top, and bottom for describing positional relationships between respective member and directions merely indicate positional relationships and directions in the drawings. Such words do not indicate positional relationships and directions of the member mounted in an actual apparatus. Also, note that the reference numerals, figure numbers and supplementary descriptions are shown below for assisting the reader in finding corresponding components in the description of the preferred embodiments below to facilitate the understanding of the present invention. It should be noted that these expressions in no way restrict the scope of the present invention. FIG. 1 is a cross sectional view of a brushless motor 10 including a resolver 20 according to a preferred embodiment of the present invention.

The brushless motor 10 preferably includes a housing 11 having a substantially cylindrical shape with a closed end and concentric with the central axis J1. The housing 11 preferably includes therein a stator 12 and a rotor magnet 13. An upper portion of the housing 11 is open and has mounted therein a bracket 15. The bracket 15 and the housing 11 each preferably include a ball bearing 16 which is a bearing portion thereof. The ball bearing 16 rotatably supports a shaft 17. Also, a resolver 20 is retained by the bracket 15.

The stator 12 is arranged at an inner surface of the housing 11. The stator 12 preferably includes a core back portion 12a having a substantially annular shape and a plurality of teeth 12b each extending in a radially inward direction from the core back portion 12a. The rotor magnet 13 is arranged at an outer circumferential surface of a yoke 18 which is arranged at the shaft 17. Also, the rotor magnet 13 rotates uniformly with the shaft 17 around the central axis J1.

The shaft 17 preferably has secured thereon a resolver rotor 21 of the resolver 20 which is a position detection mechanism. Also, a resolver start 22 is affixed to the bracket 15 radially opposite from the resolver rotor 21.

With such configuration, the resolver 20 detects a rotational position of the rotor magnet 13. A control apparatus (not shown) supplies to a predetermined coil formed around the tooth 12b arranged in the stator 12 electricity in accordance with the rotational position of the rotor magnet 13 in order to change the magnetic pole of each tooth 12b causing the rotor magnet 13 to rotate. By virtue of such configuration, the brushless motor 10 generates a rotary drive force.

Figure 2:
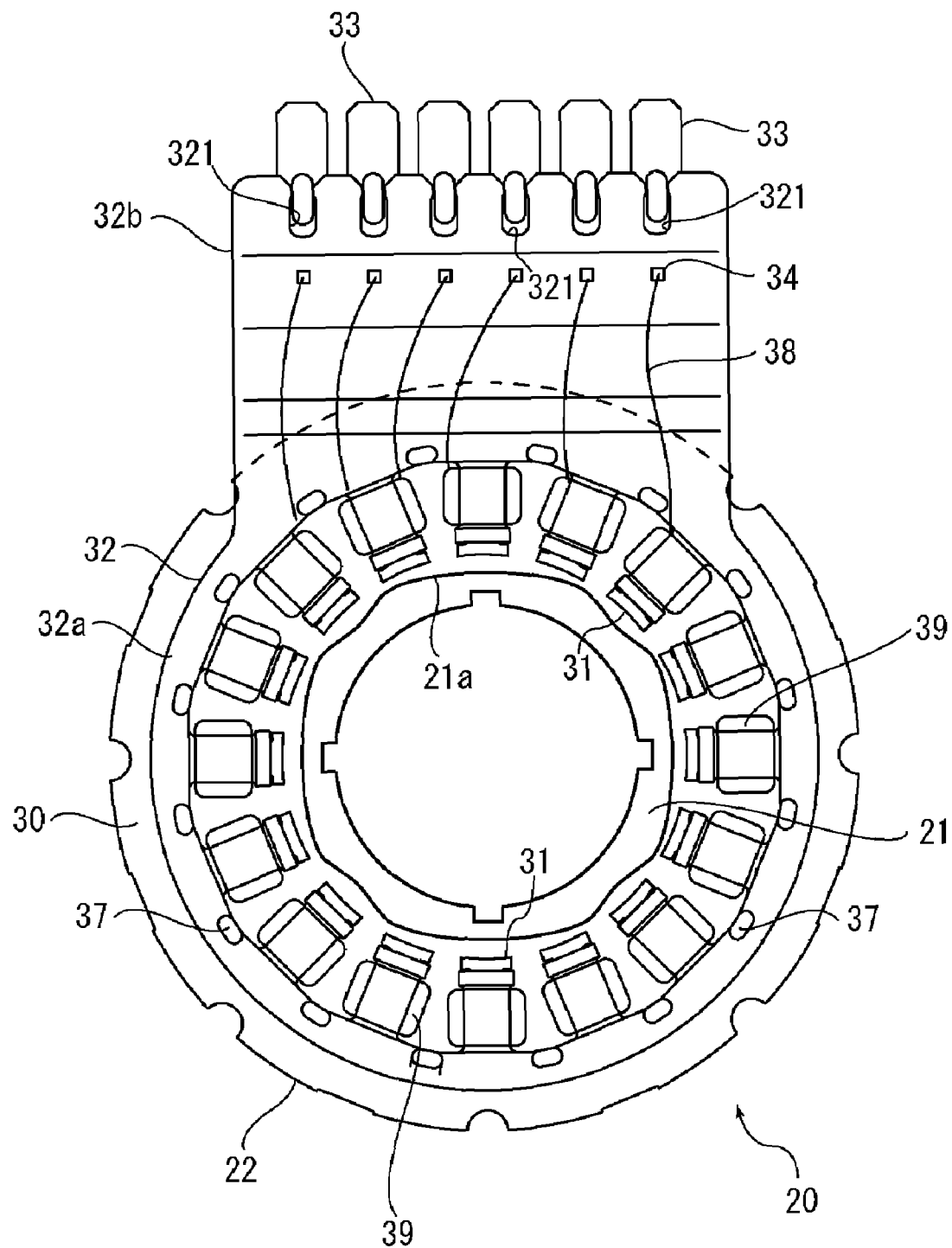
FIG. 2 is a plan view of a resolver according to a preferred embodiment of the present invention.
Figure 3:
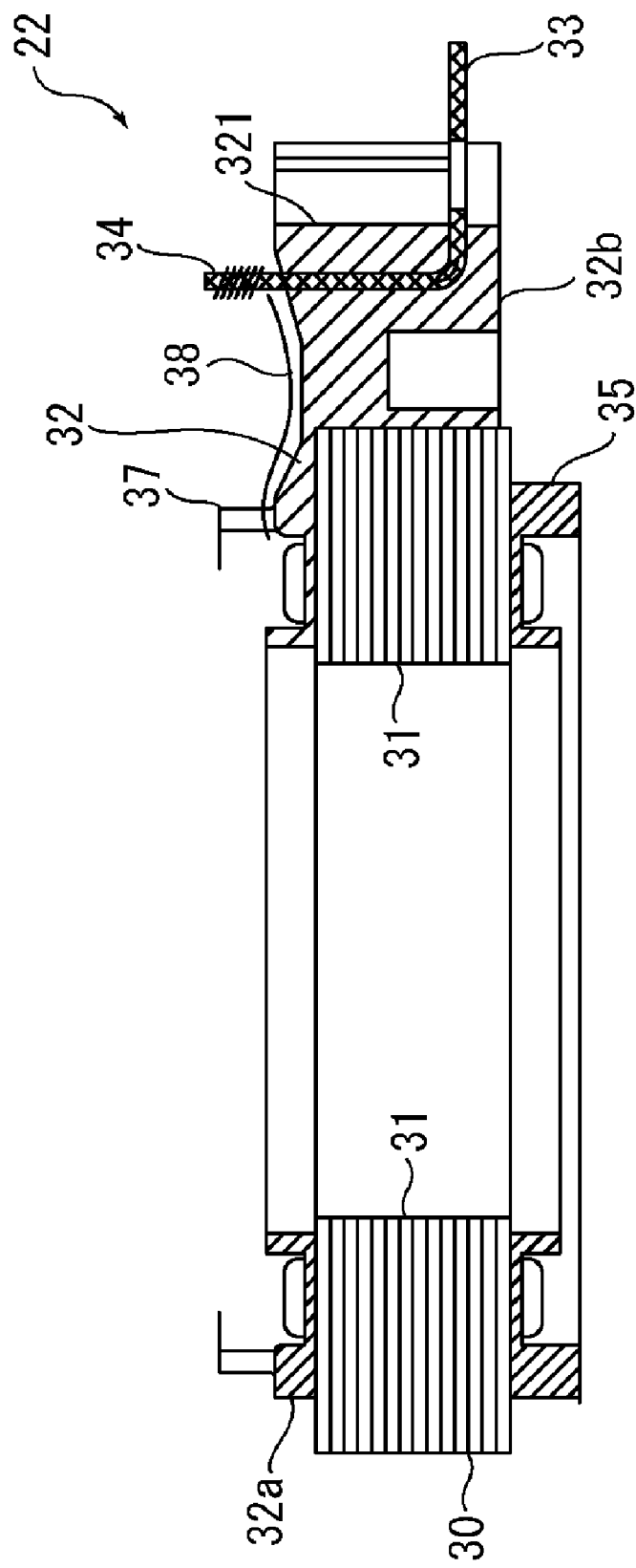
FIG. 3 is a cross sectional view of a resolver stator according to a preferred embodiment of the present invention.

FIG. 2 is a plan view of the resolver 20 according to the present preferred embodiment of the present invention (i.e., the resolver 20 shown in FIG. 1 is seen from above). FIG. 3 is a cross sectional view of the resolver stator 22 according to the present preferred embodiment of the present invention.

As shown in FIG. 2, the resolver stator 22 preferably includes a core back 30 having a substantially annular shape, and a plurality of teeth 31 arranged inward of the core back 30. Each tooth 31 is arranged opposing to the resolver rotor 21 arranged radially inwardly of the resolver stator 22. As shown in FIG. 2, the resolver rotor 21 has a substantially circular shape having a plurality (for example, 4 in the present preferred embodiment) of protrusion portions 21a. Therefore, when the resolver rotor 21 and the shaft 17 rotate in a uniform manner, a gap will be generated between the resolver rotor 21 and the teeth 31.

Figure 4:
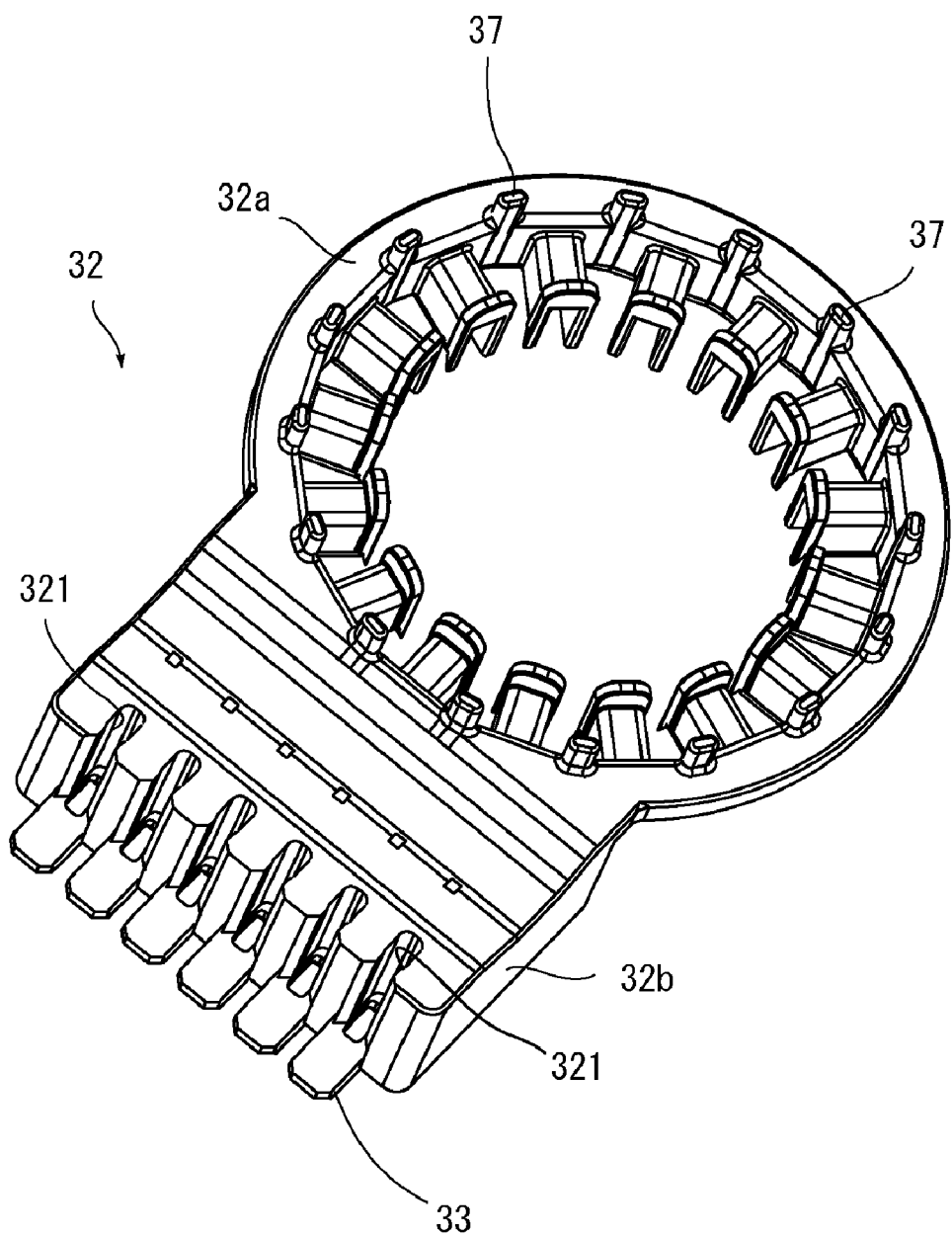
FIG. 4 is a perspective view of an upper side of an insulator according to a preferred embodiment of the present invention.
Figure 5:
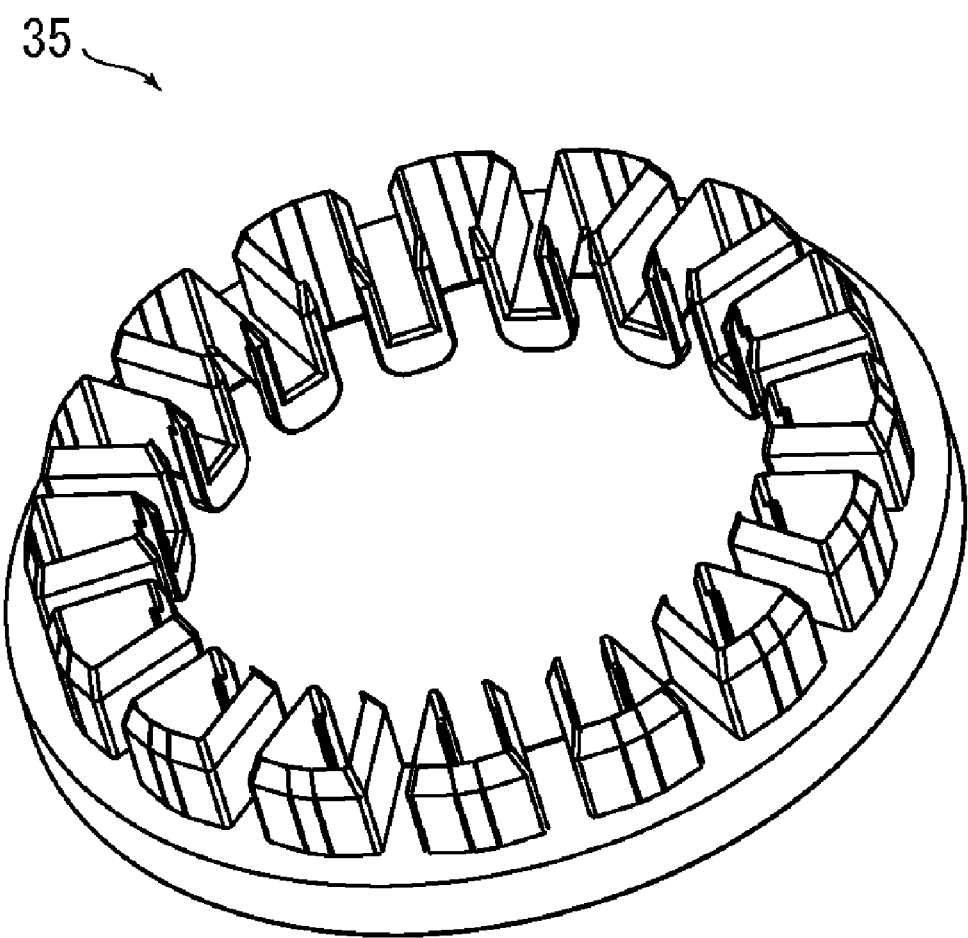
FIG. 5 is a perspective view of a lower side of the insulator according to a preferred embodiment of the present invention.

As shown in FIG. 3, an insulator 32 and an insulator 35 each made of a resin material are arranged so as to sandwich the core back 30 in the axial direction. As shown in FIG. 4, the insulator 32 preferably includes at an upper side of the core back 30 an annular portion 32a, and a connector portion 32b extending from an outer circumference of the annular portion 32a in the radially outward direction. Also, as shown in FIG. 5, the insulator 35 is an annular member arranged so as to be opposed in the axial direction to the annular portion 32a via the core back 30. That is, the annular portion of the resolver stator 22 is defined by the annular portion 32a and the insulator 35 sandwiching the core back 30.

The connector portion 32b preferably includes a conductive terminal member. As shown in FIG. 3, the terminal member has a substantially L-shape when viewed from the side with a portion thereof protruding in the radially outward direction further than the connector portion 32b. The terminal member preferably includes a lead wire connecting portion 33 to which a lead wire 51 will be connected (described below). The lead wire 51 is also connected to the control apparatus (not shown). As shown in FIG. 2 and FIG. 3, one end of the terminal member extends upward further than a top surface of the connector portion 32b in order to form a wire connecting portion 34.

As shown in FIG. 2, the connector portion 32b preferably includes a plurality (for example, 6 in the present preferred embodiment) of wire connecting portions 34 arranged linearly. The annular portion 32a preferably includes a plurality of bridge pins 37 arranged evenly apart from one another.

As shown in FIG. 2, a wire 38 is wound about the resolver stator 22. One end of the wire 38 is wound about the wire connecting portion 34 and the other end is wound about the corresponding teeth 31 forming a coil 39. Note that the wire 38 between the wire connecting portion 34 and the tooth 31 is slackened. The wire 38 wound about the tooth 31 is wound about another tooth 31 via a bridge pin 37. The wire 38 will be connected to the wire connecting portion 34 after having been wound about a predetermined number of teeth 31. Also note that the wire 38 between the wire connecting portion 34 and the tooth 31 is slackened.

One of the three wires 38 is an excitation winding wire through which electricity is provided so as to energize the tooth 31. Other two wires 38 are output winding wire for an output voltage. The resolver 20 is a variable reluctance type (VR) resolver in which an input voltage (i.e., sine wave signal) is inputted through the excitation winding, and output voltage is obtained from the output winding wire by using a change in the gap arranged between the resolver rotor 21 and the teeth 31 and caused by the rotation of the resolver rotor 21 in order to detect the rotational position of the rotor magnet 13.

Figure 6A:
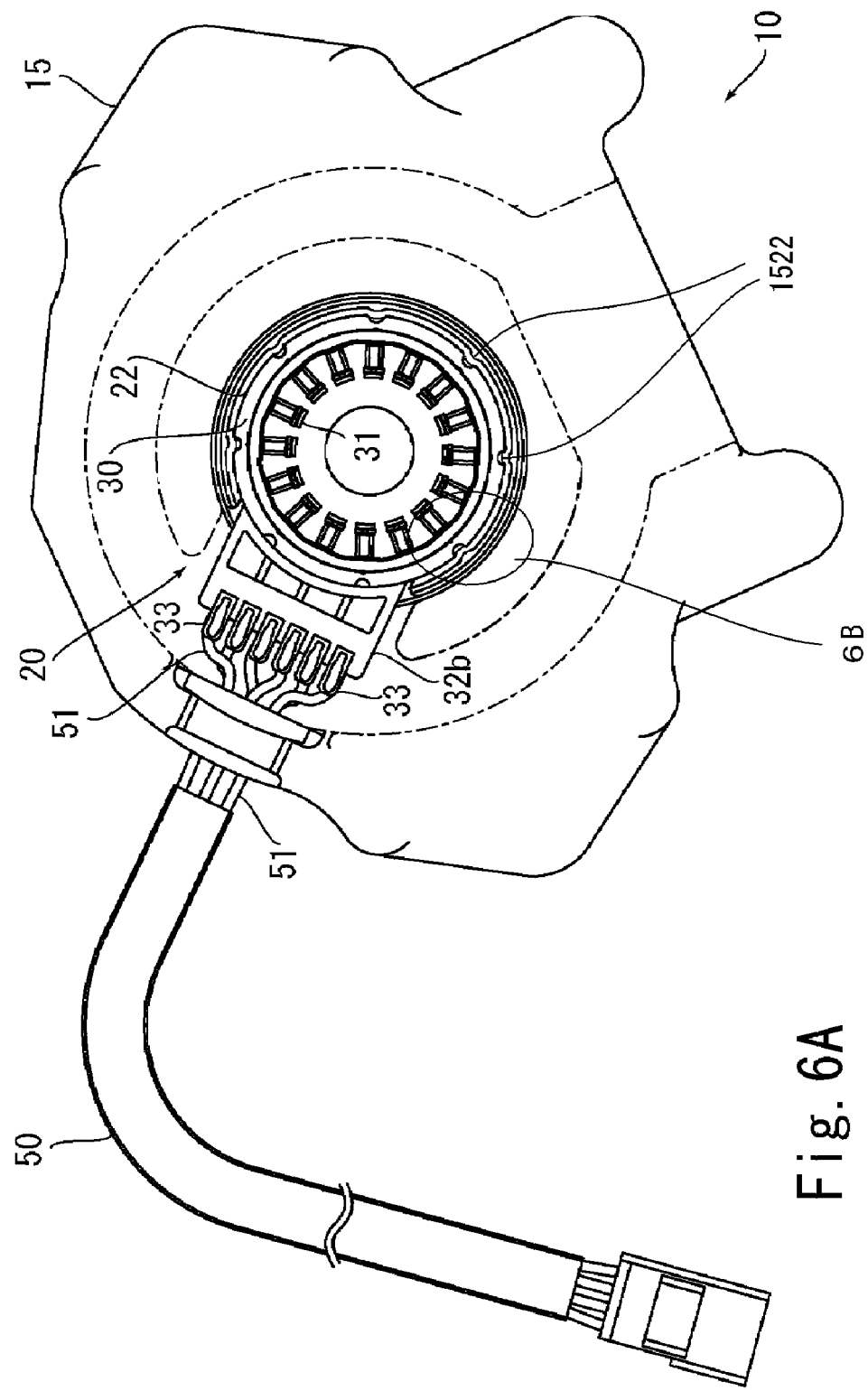
FIG. 6A is a plan view of the brushless motor and the resolver according to a preferred embodiment of the present invention.

Next, a connection structure between the terminal member and a lead wire according to the present preferred embodiment of the present invention will be described. FIG. 6A is a plan view of the brushless motor 10 according to the present preferred embodiment of the present invention. Note that a portion of the bracket 15 is depicted in a see through manner.

As shown in FIG. 6A, the plurality of lead wires 51 are connected to the connector portion 32b. A shield member made of a resin material cover the plurality of lead wires 51 so as to form a cable 50 connected to the control apparatus (not shown). The resolver 20 is connected electrically to the control apparatus via the lead wires 51.

Figure 7:
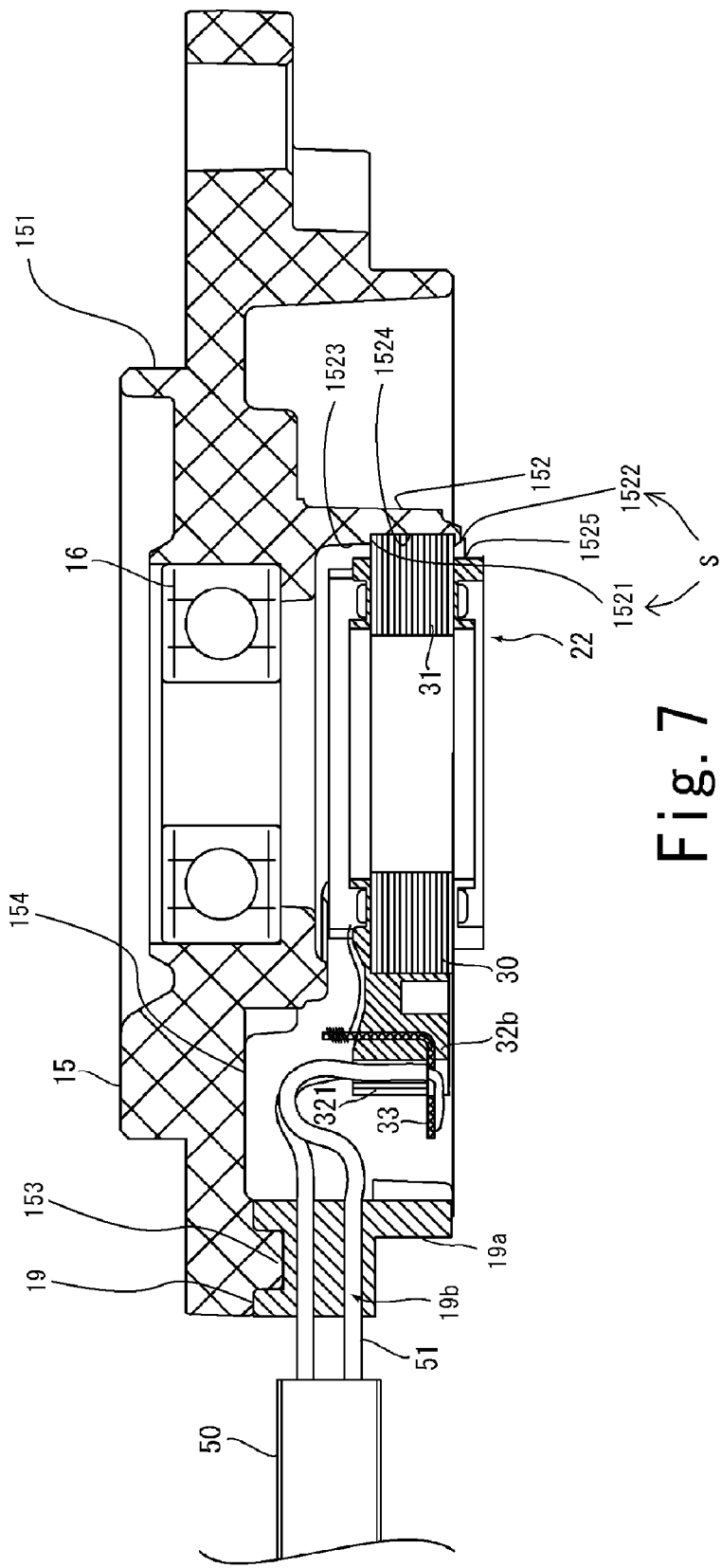
FIG. 7 is a cross sectional view of the resolver showing a connection status of a lead wire according to a preferred embodiment of the present invention.

FIG. 7 is a cross sectional view of the resolver 20 and the bracket 15. As shown in FIG. 7, an extracting portion 19 arranged between an upper end of the housing 11 and a lower end of the bracket 15 preferably includes a sealing portion 19a made of an elastic material via which the lead wire 51 is guided inward of the motor 10 from the control apparatus (not shown). To be more specific, the sealing portion 19a preferably includes an insertion hole 19b through which the lead wire 51 is guided, and seals the inner portion of the brushless motor 10.

Also, as shown in FIG. 7, protrusion 153 is arranged at a bottom surface of the bracket 15 so as to secure the sealing member 19 to the bracket 15.

Figure 8:
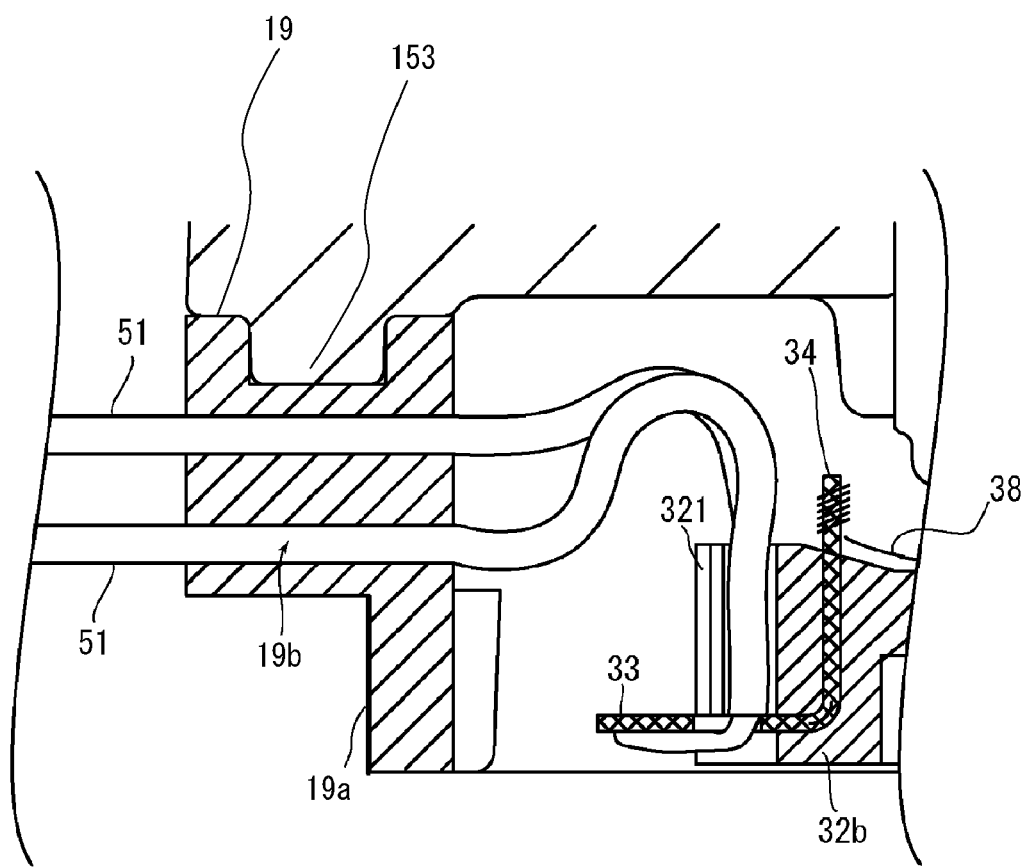
FIG. 8 is an enlarged view of the cross sectional view showing the connection status of the lead wire according to a preferred embodiment of the present invention.

FIG. 8 is an enlarged view of a portion shown in FIG. 7. In particular, FIG. 8 shows the connecting portion between the lead wire connecting portion 33 and the lead wire 51. As shown in FIG. 8, the lead wire 51 guided to the inner portion of the brushless motor 10 via the insertion hole 19a is bent in an upward direction close to an upper portion of the connector portion 32b. At this point, a portion of the lead wire 51 will be accommodated in a concave portion 154 arranged at the bracket 15. Then, the lead wire 51 is bent in a downward direction close to the upper portion of the connector portion 32b and guided to a guiding groove 321 arranged at a radial end portion of the connector portion 32b.

Next, a connecting structure of the resolver stator 22 will be described. As shown in FIG. 7, the bracket 15 preferably includes a base portion 151 extending from an outer circumferential portion of the ball bearing 16 in the radial direction, and a cylindrical portion 152 extending from the base portion 151 in the axially downward direction. The resolver stator 22 is affixed to the bracket 15 by a retaining mechanism S arranged at the cylindrical portion 152.

The retaining mechanism S preferably includes a first positioner portion 1521 and a second positioner portion 1522. The first positioner portion 1521 is preferably a surface having a substantially discoid shape connecting an upper side inner circumferential surface 1523 arranged at an inner circumferential surface of the cylindrical portion 152 with a lower side inner circumferential surface 1524 which is arranged below the upper side inner circumferential surface 1523 and has a diameter greater than that of the upper side inner circumferential surface 1523. The second positioner portion 1522 is formed by deforming a portion of a bottom end portion 1525 in the radially inward direction.

The core back 30 of the resolver stator 22 fits the lower side inner circumferential surface 1524 of the cylindrical portion 152. At this point, when a top surface of the core back 30 makes contact with the first positioner portion 1521, an axial movement in an upward direction of the core back 30 will be minimized. Also, when a bottom surface of the core back 30 makes contact with the second positioner portion 1522, an axial movement in a downward direction of the core back 30 will be minimized. By virtue of such configuration, the core back 30 of the resolver stator 22 is sandwiched between the first positioner portion 1521 and the second positioner portion 1522 so as to secure the bracket 15 to the resolver stator 22.

Figure 6B:
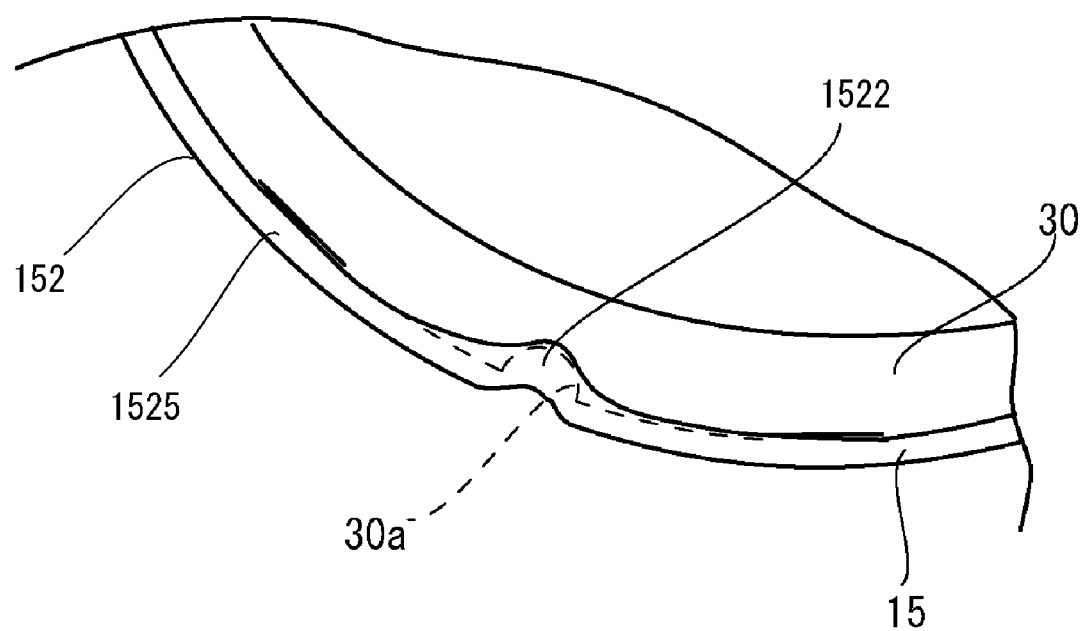
FIG. 6B is an enlarged view of a portion of the resolver according to a preferred embodiment of the present invention.

FIG. 6B is a diagram showing the core back 30 secured by the bracket 15 by the second positioner portion 1522. As shown in FIG. 2, an outer circumference of the core back 30 includes a plurality (for example, 8 in the present preferred embodiment) of grooves 30a extending along the central axis J1. As shown in FIG. 6B, the second positioner portion 1522 is formed when the bottom end portion 1525 is partially deformed at a portion thereof corresponding to the grooves 30a. By virtue of such configuration, a portion of the second positioner portion 1522 corresponding to the groove 30a is deformed inwardly so as to minimize the circumferential movement of the resolver stator 22.

The resolver stator 22 according to the present preferred embodiment of the present invention is secured by the bracket 15 by the retaining mechanism S as described above, and therefore, the axial and circumferential movements are effectively restricted without the use of an additional component (e.g., adhesive, or the like).

Note that a process such as cutting process is applied to the lower side inner circumferential surface 1524 in which the core back 30 will be fitted in order to improve the alignment between the resolver stator 22 and the resolver rotor 21. It is to be noted that if the cutting process will be applied to the lower side inner circumferential surface 1524, a device restricting the circumferential movement of the resolver stator 22 will be required. For example, a key groove in the axial direction on the lower side inner circumferential surface 1524 may arranged after the cutting process. However, this requires an additional step in the process and therefor will increase the manufacturing cost. On the other hand, according to the resolver 20 of the present preferred embodiment of the present invention, the grooves 30a of the core back 30 and the second positioner portion 1522 require no additional step in the procedure to minimize the circumferential movement of the resolver stator 22.

According to the present preferred embodiment of the present invention, the resolver stator will be securely affixed to the bracket without any additional component while maintaining the radial dimension of the resolver. Therefore, the brushless motor having such resolver is suitable for the power steering apparatus in which there is a limited space therefor. According to the brushless motor of various preferred embodiments of the present invention, a secure connection between the resolver having a supreme durability against shaking and vibration of the automobile, or the like, will be achieved.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
   a shaft;
   a rotor magnet rotating along with the shaft centering around a central axis;
   a stator arranged radially opposite from the rotor magnet;
   a substantially cylindrical housing arranged to retain the stator, and including an opening portion at an axially upper side;
   a bracket arranged to cover the opening portion of the housing;
   a plurality of bearing portions supporting the rotor magnet with respect to the stator; and
   a resolver arranged to detect a rotational position of the rotor magnet, the resolver including:
      a resolver rotor affixed to the shaft; and
      a resolver stator including an annular portion arranged coaxially with the central axis and radially opposite from the resolver rotor, and a connector portion extending from the annular portion in a radially outward direction; wherein
      the bracket has a substantially cylindrical portion extending in an axially downward direction, and the substantially cylindrical portion includes a retaining mechanism arranged to retain the resolver stator, and
      the retaining mechanism includes a first positioner portion, and a second positioner portion arranged axially below the first positioner portion, the first positioner portion is arranged to contact with a top surface of the resolver stator, the second positioner portion is defined by a deformed portion of a bottom end portion of the substantially cylindrical portion that is deformed in a radially inward direction, and the resolver stator is sandwiched between the first positioner portion and the second positioner portion.

2. The motor according to claim 1, wherein an outer circumferential surface of the annular portion includes a plurality of grooves extending along the central axis, and the second positioner portion is arranged at a position corresponding to at least two of the grooves.

3. The motor according to claim 1, wherein the resolver includes a lead wire electrically connecting the resolver and a control apparatus, and an extracting portion arranged between the housing and the bracket, via which the lead wire is guided, includes a sealing portion made of an elastic member including an insertion hole through which the lead wire is arranged.

4. The motor according to claim 3, wherein the bracket defining a portion of the extracting portion includes a protrusion portion protruding in the axially downward direction.

5. The motor according to claim 3, wherein a first bearing portion which is one of the plurality of bearing portions is retained by the bracket axially above the resolver stator, and a second bearing portion which is another one of the plurality of bearing portions is arranged axially below the stator, the bracket includes at a portion radially outward of the first bearing portion a concave portion in which a portion of the lead wire is accommodated.

6. A power steering apparatus comprising the motor according to claim 1.

* * * * *